Feb. 3, 1970 G. V. PATSER ET AL 3,493,745
APPARATUS FOR PREVENTING COLLISION BETWEEN TWO
ELECTRICALLY CONDUCTIVE AND RELATIVELY MOVABLE
SERVO-CONTROLLED ELEMENTS
Filed June 16, 1966 2 Sheets-Sheet 1

INVENTORS
GEORGE V. PATSER
CARL J. BRUNNETT
BY
*Watts & Fisher*
ATTORNEYS

Feb. 3, 1970
G. V. PATSER ET AL
3,493,745
APPARATUS FOR PREVENTING COLLISION BETWEEN TWO
ELECTRICALLY CONDUCTIVE AND RELATIVELY MOVABLE
SERVO-CONTROLLED ELEMENTS
Filed June 16, 1966
2 Sheets-Sheet 2
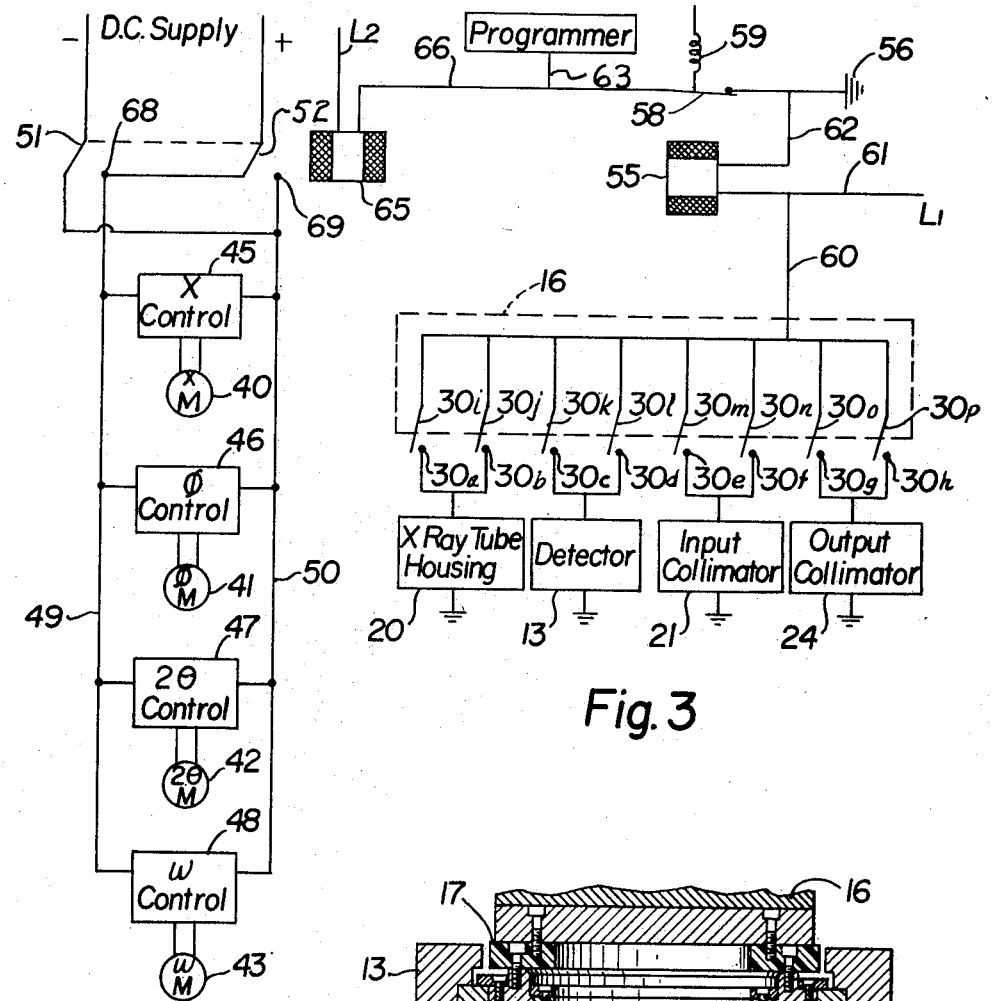
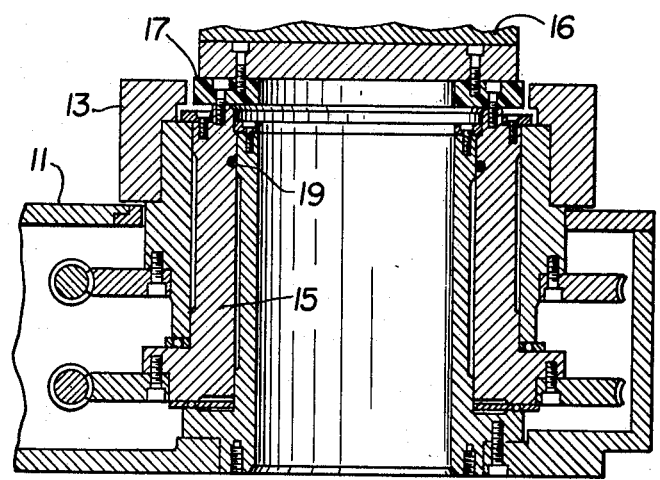
INVENTORS
GEORGE V. PATSER
CARL J. BRUNNETT
BY Watts & Fisher
ATTORNEYS United States Patent Office 3,493,745
Patented Feb. 3, 1970

3,493,745
APPARATUS FOR PREVENTING COLLISION BETWEEN TWO ELECTRICALLY CONDUCTIVE AND RELATIVELY MOVABLE SERVO-CONTROLLED ELEMENTS
George V. Patser, Willowick, and Carl J. Brunnett, Mayfield Heights, Ohio, assignors, by mesne assignments, to Picker Corporation, White Plains, N.Y., a corporation of New York
Filed June 16, 1966, Ser. No. 557,960
Int. Cl. G01n 23/20
U.S. Cl. 250—51.5    15 Claims

ABSTRACT OF THE DISCLOSURE

The disclosed apparatus is an X-ray, non-destructive testing mechanism having a goniostat structure movable relative to a diffractometer structure. The structures are electrically insulated from one another and one of them is connected to ground and another to a low potential voltage source. A relay is connected to the low voltage source. If compressible conductive contacts on the structures collide, a circuit is completed which reverses any motor driving the structures relatively to prevent damage.

---

This invention relates to a mechanism for preventing collision between two relatively moving parts, which mechanism is especially suited for use in an X-ray diffractometer.

Frequently an X-ray diffractometer is equipped with a device known as a goniostat. One such goniostat is the device described and claimed in United States Patent No. 3,189,741, issued June 15, 1965, to G. V. Patser under the title "Goniostat." The goniostat of that patent has an annular rotatable ring known as a chi member. The chi member is mounted in a suitable goniostat housing which in turn is mounted on the diffractometer. The chi ring carries a rotatable phi head. The phi head is rotatable about an axis which is a radius of the chi ring. The phi head may be orbited about the chi axis through rotation of the chi ring or spun on the phi axis which is a radius of the chi ring.

The entire goniostat is mounted on a portion of the diffractometer known as the omega member and is rotatable about a third axis sometimes known as the omega axis and at other times identified as the theta axis. The omega axis is an axis which is perpendicular to the chi axis. These three axes intersect at a point.

In the preferred construction, the diffractometer is made in accordance with United States Patent No. 3,218,458, issued Nov. 16, 1965, to T. C. Furnas, Jr., under the title "Diffractometer." In the diffractometer of the Furnas patent, an X-ray tube is mounted on the diffractometer housing. When a goniostat is used, an incident beam collimator is secured to the output of the X-ray tube to direct a beam of X-rays at the point of the intersection of the phi, chi, and omega axes. The incident beam collimator used with the goniostat is of the so-called "pinhole" type and is a long, tubular-like member projecting close to the intersection of these three axes.

The diffractometer includes an element known as the two-theta member. This is a member which rotates about the omega or theta axis. A detector is carried by the two-theta arm. A diffracted side collimator similar to the incident beam collimator, is connected to the detector. The diffracted side collimator is also a long, thin tubular member.

With the four described rotations and the various elements which have been described present, it will be recognized that there are many points of potential collision in a diffraction study. These points of collision include collision of the goniostat with either the X-ray tube or the detector in either direction of rotation, and collision of the input or output collimator with either the phi head or the goniostat housing in either direction of rotation.

With the complex studies which are now undertaken with diffraction equipment of the type which has been described, it is not uncommon to use computer-like mechanisms known as programmers. With punch cards and a device known as a four-angle programmer, an entire study may be pre-programmed. A series of punch cards may be employed so that a study may be made which includes a sequence of pre-programmed operations. With the possibility of human error, either in setting up the program initially or in transferring the program to punch cards, and the possibility of the programmer failing, there is danger that a collision will occur.

Since X-ray diffraction equipment is both extremely accurately made and therefore expensive, any collision can cause injury which malaligns components of the diffractometer and therefore causes, though slight in appearance, very costly damage.

Conventionally, limit switches are employed to control movement of relatively movable members. With some mechanisms such as a diffractometer, conventional switches are not suitable for several reasons. These reasons include: (1) the very limited space available; (2) the difficulty of mounting such switches on some components and of supplying power to the switches; and, (3) the presence of limit switches would impair both the set up and the use of the device.

The principal problem which has been met and solved by this invention is the provision of a unique mechanism which automatically prevents collisions. The structure of this invention is flexible and compact so that it can easily be positioned at potential points of impact without interfering with the operation of the device. In the preferred arrangement, the mechanism reverses any operating one of the several motors included in a diffractometer whenever a collision is about to occur.

To achieve this objective, the goniostat is electrically insulated from the balance of the diffractometer. Small, resilient, electrically conductive contact points are connected to the goniostat components at each location where there is potential collision with parts of the diffractometer. Complemental, resilient, and electrically-conductive members are secured to the diffractometer and positioned for engagement with the goniostat contact points when a collision would otherwise occur. When a goniostat contact engages a complemental contact, the goniostat is grounded, completing a circuit. This completed circuit is operative to stop any operating motor and preferably to reverse it.

The principal objects of the invention are to provide a novel and improved mechanism which prevents collision of two relatively-moving devices and a method of preventing collisions.

Other objects and a fuller understanding of the invention may be had by referring to the following description and claims taken in conjunction with the accompanying drawings; in which:

FIGURE 2 is a sectional view of the diffractometer on an enlarged scale showing the insulated mounting of the goniostat;

FIGURE 3 is a schematic wiring diagram showing the circuitry for preventing collision of the relatively-rotatable mechanisms; and, FIGURE 4 is a fragmentary sectional view of the preferred form of goniostat mounting.

Figure 1:
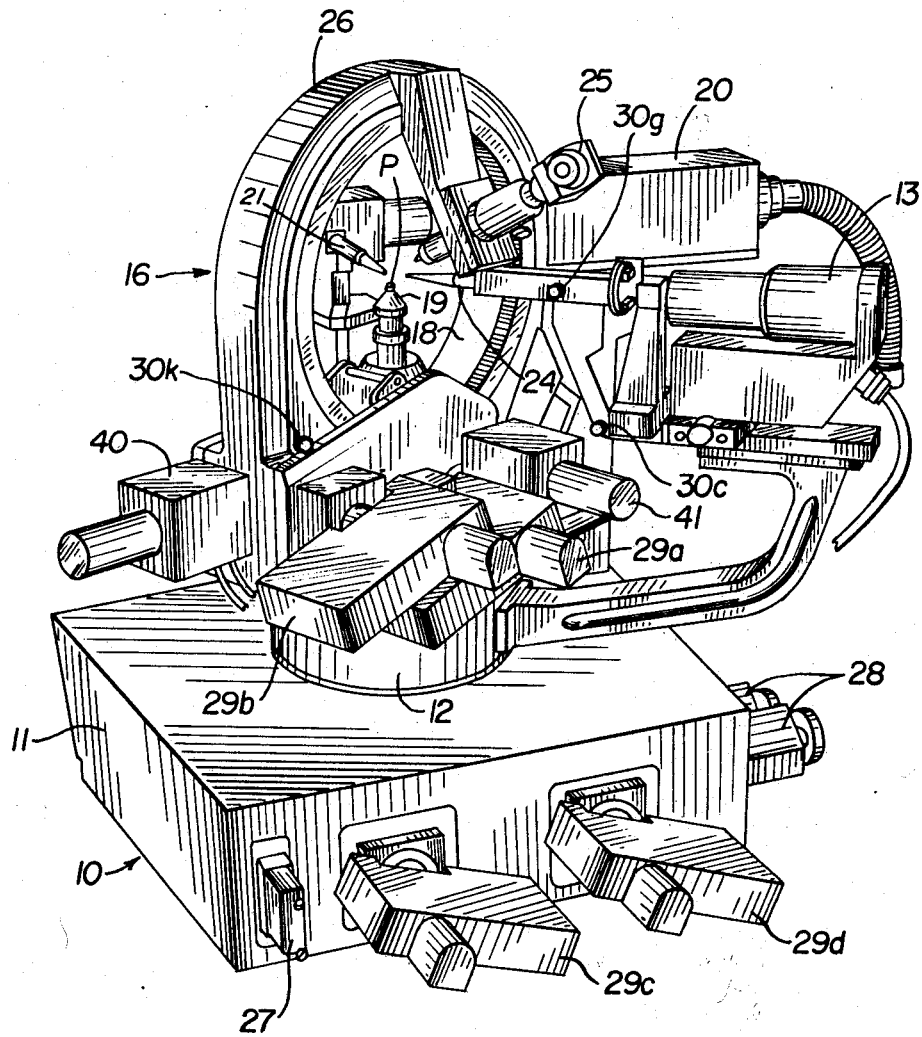
FIGURE 1 is a perspective view of a diffractometer equipped with a goniostat and the collision-preventing mechanism of this invention.
Figure 4:
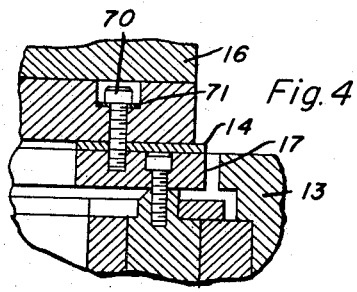

Referring now to the drawings, a diffractometer is shown generally at 10. The diffractometer is that which is disclosed more fully in the previously referenced U.S. Patent No. 3,218,458. As will be apparent from an examination of that patent, the diffractometer is capable of operation either when positioned with the housing horizontal or standing on edge and vertically oriented. In the drawings in this application, the housing is shown as horizontal with the omega-theta axis vertical and for convenience and clarity will be so described.

The diffractometer 10 includes a housing 11. A two-theta mechanism 12 is journaled in the housing for rotation about a vertical axis. This two-theta mechanism 12 carries a detector 13 for measuring diffracted radiation. As noted above, the two-theta mechanism rotates about an axis which is known as the theta axis.

An omega member 15 is journaled for rotation about this same omega-theta axis, FIGURE 2. The omega member 15 is journaled within the two-theta member. A goniostat shown generally at 16 is mounted on the omega member 15. The goniostat 16 is supported by an adaptor ring 17 which connects the goniostat to the omega member 15. The adaptor ring 17 may be formed of a plastic such as sold under the trademark Derlin by Du Pont.

The goniostat 16 includes a chi ring 18 which is rotatable about a horizontal chi axis. The chi ring intersects the omega axis at a point P. A phi head 19 is mounted on the chi ring 18. The phi head 19 supports a specimen at the point P when the device is in use. The phi head is also rotatable about a phi axis. The phi axis is a radius of the chi ring and it also intersects the point P.

In order to provide the accuracy required in X-ray diffraction the adaptor ring is made of metal in the preferred construction. A shim 14 in the form of a ring of electrically insulating material is positioned between the X-ray goniostat 16 and the adaptor ring 17. Mounting bolts 70 connect the goniostat to the ring 17. To electrically insulate the bolts from the goniostat, plastic washers 71, are placed under the heads of the bolts and the shanks of the bolts are spaced from the walls of the bolt holes in the goniostat.

A good shim material is the glycol ester of terephthalic and sold commercially by Du Pont under the trademark Mylar. The washers may be resin bonded glass fibers such as the material sold under the trademark Glastic by The Glastic Corp. of Cleveland, Ohio.

A X-ray tube is within a tube housing 20. The tube housing 20 is mounted on the diffractometer housing 11 for emitting a beam of X-rays to bombard a specimen positioned at the point P. The incident beam collimator 21 is connected to the X-ray tube housing 20 to direct a very fine beam of X-rays at the specimen. A diffracted side collimator 24 is secured to the detector 13. The diffracted side collimator is aligned with the specimen to receive diffracted X-rays and conduct them to the detector.

When the device shown in the drawing is operated, a specimen is first mounted on the phi head 19. An eyepiece 25 mounted on goniostat housing 26 is used to very accurately position the specimen at the point P. The diffractometer and goniostat may be remotely operated via electric signals provided through a receptacle 27. The position of the relatively movable members is indicated and recorded by odometers 28 and phi, chi, omega and two-beta encoders 29A–D respectively.

A plurality of the electric contact members 30A–P are provided. These members 30A–P are preferably formed of a resilient, electrically-conductive material. One suitable material is vinyl filled with silver particles which provide the electrical conductivity. This conductive plastic material is sold commercially under the trademark Eccoshield SV by Emerson and Cuming, Inc.

The purpose of the resiliency in the contacts 30A–P is to allow for some yieldable compression after electrical contact is initially established. This provides a delay time between the moment when initial contact is made and the moment when the change in the condition of the drive mechanism occurs preventing collision. Thus, continued relative movement results only in the compression of these contacts and not in any injury to the mechanism.

The conductive contacts 30A–P are secured in appropriate positions on the mechanism in complemental pairs. The securing of the contacts in position is preferably accomplished by bonding them in place with a silver-filled epoxy resin. Epoxy resins adhere to almost any surface and the silver filled epoxy provides a bond which is electrically conductive. This material is known as silver epoxy solder and is sold commercially by Joseph Waldman & Sons under catalogue No. 3022.

The use of these flexible plastic contacts permits the selective positioning of the contacts in pairs whenever desired. If accessories are added to or subtracted from the mechanism additional contacts may be simply bonded in selected places as required to prevent collisions.

Referring now to FIGURE 3 the X-ray diffractometer equipped with a goniostat includes four prime movers in the form of DC motors. These are a chi motor 40, a phi motor 41, a two-theta motor 42 and an omega motor 43. The chi and phi motors 40, 41 are visible in FIG. 1 while the two-theta and omega motors are within the diffractometer housing 11 as taught in the referenced patent entitled "Diffractometer."

The chi, phi, two-theta and omega motors are respectively controlled by controls shown schematically in FIGURE 3 and designated respectively by the numerals 45–48. The controls 45–48 are connected to a DC supply by conductors 49, 50. A pair of solenoid-actuatable switches 51, 52 are connected in the conductors 49, 50 so that, on actuation of the two switches, polarity of the DC current supplied to the four motor controls can be reversed.

As indicated schematically in FIGURE 3, the X-ray tube housing 20, the detector 13, and the input and output collimators 21, 24 are all grounded. Since the goniostat 16 is insulated from the diffractometer, any contact of paired ones of the contacts 30A–P grounds the goniostat.

The contacts 30A–P are indicated schematically in the drawings as contacts in switches. This has been done because, as the succeeding description will make apparent, these contacts 30 operate as switches any one pair of which can complete a circuit and signal reversal of any operating motor. Thus, contacts 30A, 30B are the contacts on the X-ray tube housing. 30C and 30D are the contacts on the detector, while 30E through 30H are the contacts respectively on the input and output collimators.

In FIGURE 3 the goniostat 16 is indicated schematically by the dash lines. Contacts carried by the goniostat and components of it are: (1) contacts 30I and 30J which are respectively paired with contacts 30A and 30B on the X-ray tube housing; (2) contacts 30K and 30L are respectively paired with contacts 30C and 30D on the detector; (3) contacts 30M and 30N are respectively paired with the input collimator contacts 30E and 30F; and (4) contacts 30O and 30P are respectively paired with contacts 30G and 30H on the output collimator.

A master solenoid 55 is provided. The master solenoid 55 is connected to a line L–1 by conductor 61 and to ground at 56 by conductor 62. When the mechanism is turned on and one of the motors is energized from the DC supply, the master solenoid 55 is energized to open a normally-closed switch 58, as against the action of a spring 59. The purpose of this switch 58 will be described presently.

A conductor 60 connects the goniostat 16 and therefore its contacts 30I–30P inclusive, to the line L–1 via the conductor 61. As noted above, whenever any one of the goniostat contacts 30I–30P contacts the paired one of the contacts 30A–30H the goniostat is grounded. Grounding of the goniostat completes a circuit between L–1 as one side of a power source and ground as the other. This circuit shunts out the master solenoid 55 de-energizing it.

When the master solenoid is de-energized, the spring 59 will close the switch 58. When a programmer is used, it is desirable to send a signal to it whenever the switch 58 is closed. This is accomplished through conductor 63.

A direction control solenoid 65 is provided. The direction control solenoid is energized by a line L–2. Whenever the switch 58 is closed, the direction control solenoid 65 is connected to ground at 56 by conductor 66. Grounding of the direction control solenoid 65 completes a circuit energizing the solenoid. When the direction control solenoid is energized, it actuates the switches 51, 52.

The actuation of the switches 51, 52 brings them in contact with contacts 68, 69 respectively, reversing the polarity in conductors 49, 50. Since the four diffractiometer motors 40–43 are DC motors, a reversing of the polarity will reverse the direction of operation of each motor. Thus, no matter which one or ones of the four motors is operative, any grounding of the goniostat 16 will result in reversal of the direction of operation of the operating motor due to the reversal of the polarity of the DC current supply to it.

Reversing the direction of motor operation prevents a collision by causing any two parts which were about to collide to commence to move apart. Obviously, a collision can also be prevented by stopping the motors. This can be done easily by breaking one or both of conductors 49, 50. To accomplish this, one of the switches 51, 52 may be eliminated and the other may be a single pole, rather than a double pole, switch. Thus, in either event, the motor is stopped and the relative movement of the two potentially colliding members is stopped. Thereafter, in the preferred arrangement, the motor is driven in the reverse direction.

Although the invention has been described in its preferred form with certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a non-destructive testing mechanism, including a diffractometer assembly and a goniostat assembly relatively movable with respect to a portion of the diffractometer assembly, the combination of:
   (a) a prime mover connected to the assemblies for relatively moving the goniostat assembly and said diffractometer assembly portion;
   (b) control means adapted to control normal operation of the prime mover during such relative movement;
   (c) a collision preventing means for preventing damaging collision of the two assemblies during operation occasioned by relative movement past the proper limit of such relative movement comprising:
      (i) a source of electric energy having first and second sides;
      (ii) each of said assemblies including an electrically-conductive contactible portion;
      (iii) circuit portions respectively connecting the first side of said source of energy to the contactible portions on one of the assemblies and the second side of said source of energy to the contactible portions on the other of said assemblies;
      (iv) said contactible portions connecting the circuit portions to complete a circuit whenever contact is established therebetween; and,
      (v) stoppage means actuated on completion of said circuit and connected to the prime mover to stop relative movement of the assemblies whenever the circuit is completed; and,
   (d) an assembly insulating member interposed between the goniostat assembly and said diffractometer portions to prevent completion of a circuit of said circuit portions during normal operation of the mechanism.

2. The mechanism of claim 1 wherein the contactible portions are compressible.

3. The mechanism of claim 1 wherein the relative movement of said goniostat assembly relative to said diffractometer assembly portion is rotated about an omega axis and wherein the goniostat includes relatively rotatable portions certain of which are rotatable about a chi axis and other of which are rotatable about a phi axis and wherein the diffractometer assembly includes means to rotate parts of the diffractometer assembly about a two-theta axis relative to other parts of the diffractometer assembly wherein there are a plurality of prime movers provided for said rotations and wherein upon completion of said circuit and stoppage means stops any operating one of said prime movers.

4. The mechanism of claim 1 wherein said stoppage means includes means to reverse the operation of said prime mover after the prime mover has been stopped on completion of said circuit.

5. The mechanism of claim 1 wherein one of said circuit sides is ground and the other is at low potential.

6. A non-destructive testing mechanism comprising:
   (a) a diffractometer including:
      (i) a two-theta member;
      (ii) a housing;
      (iii) a detector and a detector side collimator mounted on the two-theta member;
      (iv) an X-ray tube housing connected to the diffractomer housing;
      (v) an input side collimator connected to the tube housing and positioned for emitting a beam of X-rays on a specimen;
      (vi) said diffractometer including an omega member, the omega member including a mounting element of electrically insulating material;
   (b) a goniostat mounted on said omega member and electrically insulated therefrom by the mounting element;
   (c) said goniostat and diffractometer being relatively rotatable, electrically conductive structures, one of said structures being connected to a source of electric current and the other of said structures being grounded;
   (d) a plurality of pairs of contacts, one contact of each pair being secured to the goniostat and the other contact of each pair being secured to the diffractometer for electrical connection with one another when a point of collision is approached, whereby to complete a circuit between said source of electric energy and ground;
   (e) a plurality of electric motors connected to selected components of the diffractometer and the goniostat to cause rotation of appropriate components of said diffractometer and goniostat about chi, phi, omega and two-theta axes; and,
   (f) motor control means connected to a selected structure for stopping motor operation whenever said circuit is completed.

7. The mechanism of claim 6 wherein the mounting element is a plastic ring.

8. The mechanism of claim 6 wherein said motor control means includes a normally closed switch and a relay holding said switch open when the device is in operation and wherein said relay is shunted out whenever said circuit is closed.

9. The device of claim 6 wherein said motors are DC motors connected to a DC supply and wherein the polarity of said supply is reversed whenever said motor control means is actuated.

10. In a mechanism having first and second relatively movable structures, the combination of:
   (a) a prime mover connected to the structures for moving the structures relatively;

(b) control means adapted to control normal operation of the prime mover during which the structures are moved relatively;
(c) a collision preventing means for preventing damaging collision of the two structures during operation occasioned by relative movement past the proper limit of such relative movement comprising:
  (i) a source of electric energy having first and second sides;
  (ii) each of said structures including an electrically-conductive contractible portion;
  (iii) circuit portions respectively connecting the first side of said source of energy to the contractible portions on the first structure and the second side of said source of energy to the contractible portions on the second structure;
  (iv) said contractible portions connecting the circuit portions to complete a circuit whenever contact is established therebetween; and,
  (v) stoppage means actuated on completion of said circuit and connected to the prime mover to stop relative movement of the structures whenever the circuit is completed; and,
(d) a structure insulating member interposed between the structures to prevent completion of a circuit of said circuit portions during normal operation of the mechanism.

11. The mechanism of claim 10 wherein the contractible portions are compressible.

12. The mechanism of claim 10 wherein the stoppage means include means to reverse the operation of said prime mover after the prime mover has been stopped by the stoppage means on completion of said circuit.

13. The mechanism of claim 10 wherein there are a plurality of prime movers and said stoppage means includes means adapted to stop any operating ones of the prime movers upon completion of said circuit.

14. The mechanism of claim 13 wherein the stoppage means includes means to reverse each operating prime mover after each such prime mover has been stopped upon completion of said circuit.

15. The mechanism of claim 10 wherein one of said circuit sides is ground and the other is at low potential.

References Cited

UNITED STATES PATENTS

| | | | |
|---|---|---|---|
| 2,251,054 | 7/1941 | Horowitz et al. | 318—466 X |
| 3,189,741 | 6/1965 | Patser | 250—51.5 |
| 3,218,458 | 11/1965 | Furnas | 250—51.5 |

WILLIAM F. LINDQUIST, Primary Examiner

U.S. Cl. X.R.
318—466, 478

PO-1050
(5/69)

UNITED STATES PATENT OFFICE
CERTIFICATE OF CORRECTION

Patent No. 3,493,745                    Dated February 3, 1970

Inventor(s) George V. Patser and Carl J. Brunnett

It is certified that error appears in the above-identified patent and that said Letters Patent are hereby corrected as shown below:

Claim 3, line 3, delete "rotated" substitute - - rotation - - claim 3, line 12, delete "and" substitute - - said - - -

Claim 10, subparagraph (ii) line 2, delete "contractible"

substitute - - contactible - -

Claim 10, subparagraph (iii) line 5, delete "contractible"

substitute - - contactible - -

Claim 10, subparagraph (iv) line 1, delete "contractible"

substitute - - contactible - -

Claim 11, delete "contractible" substitute - - contactible - -

SIGNED AND
SEALED
JUL 14 1970

(SEAL)
Attest:

Edward M. Fletcher, Jr.
Attesting Officer

WILLIAM E. SCHUYLER, JR.
Commissioner of Patents